(12) United States Patent  
Ando

(10) Patent No.: US 11,685,191 B2  
(45) Date of Patent: Jun. 27, 2023

(54) STEEL CORD FOR REINFORCING RUBBER ARTICLE

(71) Applicant: BRIDGESTONE CORPORATION, Tokyo (JP)

(72) Inventor: Nobuhiro Ando, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 101 days.

(21) Appl. No.: 17/274,218

(22) PCT Filed: Sep. 9, 2019

(86) PCT No.: PCT/JP2019/035401  
§ 371 (c)(1),  
(2) Date: Mar. 8, 2021

(87) PCT Pub. No.: WO2020/054673  
PCT Pub. Date: Mar. 19, 2020

(65) Prior Publication Data  
US 2021/0316570 A1 Oct. 14, 2021

(30) Foreign Application Priority Data  
Sep. 11, 2018 (JP) .................. 2018-169900

(51) Int. Cl.  
*B60C 9/00* (2006.01)  
*D07B 1/06* (2006.01)

(52) U.S. Cl.  
CPC .......... *B60C 9/0007* (2013.01); *D07B 1/0613* (2013.01); *D07B 1/0666* (2013.01);  
(Continued)

(58) Field of Classification Search  
CPC .......... B60C 9/0007; B60C 2009/0014; D07B 1/0613; D07B 1/0666; D07B 2201/2065  
See application file for complete search history.

(56) References Cited

U.S. PATENT DOCUMENTS 4,143,209 A 3/1979 Gerspacher et al.  
4,651,513 A 3/1987 Dambre  
(Continued)

FOREIGN PATENT DOCUMENTS

EP 0420788 A1 4/1991  
GB 1 466 114 A 3/1977  
(Continued)

OTHER PUBLICATIONS

International Search Report for PCT/JP2019/035401 dated Nov. 26, 2019 [PCT/ISA/210].  
Extended European Search Report dated Apr. 26, 2022 in European Application No. 19859957.3.  
(Continued)

*Primary Examiner* — Shaun R Hurley  
(74) *Attorney, Agent, or Firm* — Sughrue Mion, PLLC

(57) ABSTRACT

Provided is a steel cord for rubber article reinforcement which has excellent corrosion resistance and productivity without deterioration of adhesion with rubber. A steel cord (1) for rubber article reinforcement, in which plural steel filaments (2) are twisted together, includes: a core having at least one core filament (2c); and a sheath having at least one sheath layer formed by twisting at least one sheath filament (2s) around the core. In this steel cord (1), brass plating is performed on the steel filaments (2) and zinc plating is further performed on the outer circumference of the brass plating of the core filament (2c), and the steel filaments (2) have a diameter d of 0.1 mm to 0.6 mm.

15 Claims, 1 Drawing Sheet

(52) U.S. Cl.
CPC ............... *B60C 2009/0014* (2013.01); *B60C 2009/0085* (2013.01); *D07B 2201/2011* (2013.01); *D07B 2201/2065* (2013.01); *D07B 2201/2066* (2013.01); *D07B 2401/2095* (2013.01); *D07B 2501/2046* (2013.01); *D10B 2401/063* (2013.01); *D10B 2505/022* (2013.01)

(56) References Cited

U.S. PATENT DOCUMENTS

| | | | |
|---|---|---|---|
| 6,365,273 | B1 | 4/2002 | Baillievier |
| 2010/0031623 | A1* | 2/2010 | Vanderbeken ........ D07B 1/0613 57/221 |
| 2019/0071820 | A1 | 3/2019 | Wang et al. |
| 2020/0131699 | A1* | 4/2020 | Obana .................. D07B 1/0613 |
| 2020/0131700 | A1* | 4/2020 | Obana .................. B60C 9/0007 |
| 2021/0254279 | A1* | 8/2021 | Obana .................. B65G 15/36 |

FOREIGN PATENT DOCUMENTS

| | | |
|---|---|---|
| GB | 2 063 725 A | 6/1981 |
| JP | 49-102002 A | 9/1974 |
| JP | 54-004250 A | 1/1979 |
| JP | 56-086639 A | 7/1981 |
| JP | 61-084233 A | 4/1986 |
| JP | 2003-311544 A | 11/2003 |
| JP | 2006-183211 A | 7/2006 |
| JP | 2011-202291 A | 10/2011 |
| JP | 2015-196937 A | 11/2015 |
| WO | 2017/157973 A1 | 9/2017 |

OTHER PUBLICATIONS

Anonymous, "Non-parallel steel wire and cords for tyre reinforcement", ISO 17832, Jul. 1, 2009, International Organization for Standardization, XP055362975 (18 pages total).

* cited by examiner

STEEL CORD FOR REINFORCING RUBBER ARTICLE

CROSS REFERENCE TO RELATED APPLICATIONS

This application is a National Stage of International Application No. PCT/JP2019/035401 filed Sep. 9, 2019, claiming priority based on Japanese Patent Application No. 2018-169900 filed Sep. 11, 2018.

TECHNICAL FIELD

The present invention relates to a steel cord for rubber article reinforcement (hereinafter, also simply referred to as "steel cord"), more particularly a steel cord for rubber article reinforcement which has excellent corrosion resistance and productivity without deterioration of adhesion with rubber.

BACKGROUND ART

Generally, rubber-steel cord complexes obtained by rubber-coating a steel cord are used as reinforcing materials of rubber articles, such as tires and conveyors. These steel cords are known to be plated with zinc such that rainwater and the like do not reach their steel filaments (hereinafter, also simply referred to as "filaments") through a cut damage. This allows the plated zinc to corrode preferentially to the filaments, and corrosion of the filaments can thereby be delayed. A variety of proposals have been made on such zinc-plated steel cords.

For example, Patent Document 1 proposes a steel cord having a multi-twisted structure in which outermost-layer filaments of outermost-layer strands constituting the outer circumference of the steel cord are plated with brass, and at least one filament positioned on the inner side than the outermost-layer strands is plated with zinc. Further, Patent Document 2 proposes to perform plating with a metal having a higher ionization tendency than iron on at least one filament other than outermost-layer filaments of outermost-layer strands constituting a steel cord having a multi-twisted structure, and to control the amount of the plated metal to be 0.0015 to 0.45 mol per 1 kg of all filaments. Moreover, Patent Document 3 proposes an electrode wire for wire electric discharge machining, which includes a steel wire having a wire diameter of 0.02 to 0.20 mm as a core material, and a plating layer having a bilayer structure composed of a brass plating lower layer and a zinc plating upper layer on the surface of the core wire, the electrode wire having a prescribed tensile strength Ts.

RELATED ART DOCUMENTS

Patent Documents

[Patent Document 1] JP2011-202291A
[Patent Document 2] JP2015-196937A
[Patent Document 3] JP2003-311544A

SUMMARY OF THE INVENTION

Problems to be Solved by the Invention

However, with regard to the steel cords proposed in Patent Documents 1 and 2, a production method thereof is not examined although the adhesion with rubber and the corrosion resistance are examined. In addition, in Patent Document 3, the use for rubber article reinforcement is not examined. Therefore, at present, there is room for further investigation with regard to producing a steel cord for rubber article reinforcement, which has excellent corrosion resistance, with good productivity.

In view of the above, an object of the present invention is to provide a steel cord for rubber article reinforcement which has excellent corrosion resistance and productivity without deterioration of adhesion with rubber.

Means for Solving the Problems

The present inventor intensively studied to solve the above-described problems, and made the following finding as a result. That is, it was found that, when a zinc-plated steel wire material is drawn, for example, detachment of the plated zinc and abrasion of a die occur, and the productivity is thereby deteriorated. Based on this finding, the present inventor further intensively studied and consequently discovered that a steel cord can be produced with good productivity by adopting the following structure for the steel cord to be obtained, thereby completing the present invention.

That is, the steel cord for rubber article reinforcement according to the present invention is a steel cord for rubber article reinforcement formed by twisting plural steel filaments, the steel cord including: a core having at least one core filament; and a sheath having at least one sheath layer formed by twisting at least one sheath filament around the core, wherein brass plating is performed on the steel filaments, and zinc plating is further performed on the outer circumference of the brass plating of the core filament, and the steel filaments have a diameter d of 0.1 mm to 0.6 mm.

Further, another steel cord for rubber article reinforcement according to the present invention is a steel cord for rubber article reinforcement formed by twisting plural strands, wherein the strands each include: a core having at least one core filament; and a sheath having at least one sheath layer formed by twisting at least one sheath filament around the core, brass plating is performed on the steel filaments, and zinc plating is further performed on the outer circumference of the brass plating of the core filament, and the steel filaments have a diameter d of 0.1 mm to 0.6 mm.

In these steel cords of the present invention, it is preferred that the adhesion amount (g/m$^2$) of the brass plating on the core filament be 6d to 10d, and the adhesion amount (g/m$^2$) of the zinc plating be 25d to 95d. In the steel cords of the present invention, it is also preferred that the steel filaments have a tensile strength Ts (MPa) satisfying a relationship represented by the following formula:

$$(-2{,}000 \times d + 3{,}825) \leq Ts < (-2{,}000 \times d + 4{,}525).$$

Further, in the steel cords of the present invention, it is preferred that a gap distance L between the sheath filaments be 50 μm or less in an outermost sheath layer constituting the sheath. The steel cords of the present invention can be preferably used as tire reinforcing materials.

Effects of the Invention

According to the present invention, a steel cord for rubber article reinforcement which has excellent corrosion resistance and productivity without deterioration of adhesion with rubber can be provided.

MODE FOR CARRYING OUT THE INVENTION

Figure 1:
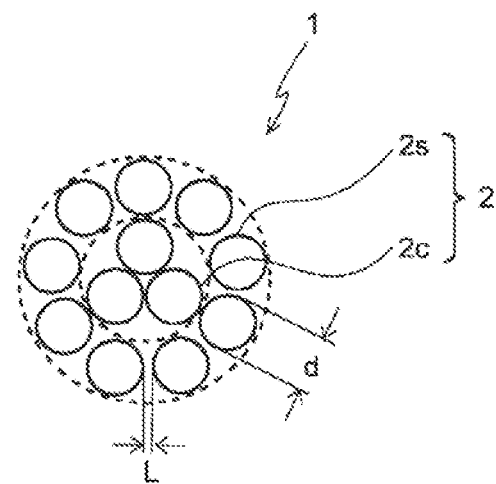
FIG. 1 is a cross-sectional view illustrating a steel cord for rubber article reinforcement according to one preferred embodiment of the present invention, which has a layer-twisted structure.

The steel cord for rubber article reinforcement according to the present invention will now be described in detail referring to the drawings. FIG. 1 is a cross-sectional view illustrating a steel cord for rubber article reinforcement according to one preferred embodiment of the present invention, which has a layer-twisted structure. A steel cord 1 of the present invention is a steel cord in which plural steel filaments 2 are twisted together, the steel cord having a layer-twisted structure that includes: a core having at least one core filament 2c; and a sheath having at least one sheath layer formed by twisting at least one sheath filament 2s around the core. The illustrated steel cord 1 has a single sheath layer formed by twisting nine sheath filaments 2s together around a core formed by twisting three core filaments 2c together.

In the steel cord 1 of the present invention, brass plating is performed on the steel filaments 2, and zinc plating is further performed on the outer circumference of the brass plating of the core filaments 2c. In this steel cord 1, corrosion of the core filaments 2c can be delayed since the zinc plating performed on the core filaments 2c corrodes preferentially to the core filaments 2c. Further, since the zinc plating is performed on the core filaments 2c, the zinc plating does not hinder the adhesion between the steel cord 1 and rubber. Moreover, as described below, the steel cord 1 having such a structure has excellent productivity.

In the steel cord 1 of the present invention, the core filaments 2c may be parallelly arranged without being twisted together; however, a structure in which the core filaments 2c are twisted together, particularly a structure in which three core filaments 2c are twisted together in the illustrated manner, is preferred. Since the core having such a structure does not have any gap through which rubber can permeate to the inside, rainwater and the like infiltrate through an internal void at a steel cord cross-section exposed by penetrating damage or the like imposed from the outside, propagate over the entire length, and corrode the steel cord. This deteriorates the durability of a rubber product. However, with zinc plating being performed on the brass plating of the core filaments 2c, the corrosion resistance of the steel cord 1 can be improved by the sacrificial anticorrosive function of the zinc plating. Therefore, the steel cord 1 of the present invention can be preferably applied to a steel cord having a structure with poor rubber permeability.

The illustrated steel cord 1 according to one preferred embodiment of the present invention has a single sheath layer; however, plural sheath filaments 2s may be twisted together on the outer side of this sheath layer to provide plural sheath layers. The steel cord 1 preferably has a (n+m) structure or a (n+m+l) structure. In the case of the (n+m) structure, n is 1 to 4 and m is 5 to 10 and, in the case of the (n+m+l) structure, l is additionally 10 to 15. Such a structure not only can be produced by the below-described steel cord production method without deteriorating the productivity of the steel cord 1, but also allows the steel cord 1 to attain a sufficient strength as a reinforcing material.

Further, in the steel cord 1 of the present invention, the filaments 2 have a diameter d in a range of 0.1 mm to 0.6 mm. The productivity of the steel cord 1 is not deteriorated as long as the diameter d of the filaments 2 is in this range. In addition, a sufficient strength can be ensured even when the steel cord 1 of the present invention is used as a tire reinforcing material. The diameter d is more preferably 0.12 mm to 0.5 mm.

In the steel cord 1 of the present invention, it is preferred that the brass plating gauge be smaller than the zinc plating gauge. In order to favorably obtain the effects of the present invention, it is necessary to secure a certain level of the zinc plating gauge. In addition, in the below-described steel cord production method, since it is required to perform a drawing process on a brass-plated steel wire material, the brass plating gauge is usually smaller than the zinc plating gauge.

Specifically, when the diameter of the filaments 2 is defined as d, it is preferred that the adhesion amount ($g/m^2$) of the brass plating on the filaments 2 be 6d to 10d, and the adhesion amount ($g/m^2$) of the zinc plating be 25d to 95d. For example, when the diameter of the filaments is 0.3 mm, the adhesion amount of the brass plating is 1.8 $g/m^2$ to 3.0 $g/m^2$, and the adhesion amount of the zinc plating is 7.5 $g/m^2$ to 28.5 $g/m^2$. By controlling the adhesion amount of the brass plating to be 6d or greater, drawability can be ensured. Meanwhile, when the adhesion amount of the brass plating is greater than 10d, the productivity is reduced, which is disadvantageous and thus not preferred from the economic standpoint. Further, by controlling the adhesion amount of the zinc plating to be 25d or greater, the corrosion resistance can be sufficiently improved. Meanwhile, when the adhesion amount of the zinc plating is greater than 95d, the productivity is reduced, which is disadvantageous and thus not preferred from the economic standpoint.

In the steel cord 1 of the present invention, zinc plating may be performed on the outer circumference of the brass plating of the steel filaments other than the outermost-layer sheath filaments 2s. By performing zinc plating on the filaments 2 other than the outermost-layer sheath filaments 2s in this manner, the above-described effects can be obtained more favorably.

In the steel cord 1 of the present invention, it is preferred that the filaments 2 have a tensile strength Ts (MPa) satisfying a relationship represented by the following formula:

$$(-2{,}000 \times d + 3{,}825) \le Ts < (-2{,}000 \times d + 4{,}525).$$

By controlling the Ts to be ($-2{,}000 \times d + 3{,}825$) or higher, a weight reduction effect is obtained since such a tensile strength can be ensured even when the filaments 2 have a small diameter, and the resistance to repeated bending fatigue is improved since such a tensile strength allows the use of fine filaments 2. Meanwhile, a tensile strength Ts of ($-2{,}000 \times d + 4{,}525$) or higher may cause frequent occurrence of filament breakage in the brass plating and impair the drawability, posing a problem in terms of the productivity.

In the steel cord 1 of the present invention, the gap distance L between the sheath filaments 2$s$ in the outermost sheath layer is preferably 50 μm or less, more preferably 20 μm or less. In order to allow rubber to permeate to the inside of the steel cord 1, it is preferred to arrange gaps between the outermost-layer sheath filaments 2$s$. However, when the gaps are large, the sheath filaments 2$s$ are unlikely to be dispersed evenly around the core; therefore, the productivity may be deteriorated, and there may be a case where rubber cannot sufficiently permeate to those areas where sheath filaments 2$s$ are concentrated. In addition, tightening of the sheath filaments 2$s$ and a reduction in the strength may occur. Accordingly, from the standpoint of attaining both satisfactory strength and satisfactory rust resistance, the gap distance L between the sheath filaments 2$s$ of the outermost sheath layer is preferably 50 μm or less.

In the steel cord 1 of the present invention, the core filaments 2$c$ and the sheath filaments 2$s$ may have the same diameter or different diameters, and the twist pitch and the twist direction of the core filaments 2$c$ and the sheath filaments 2$s$ can be selected as appropriate in accordance with a conventional method.

As the filaments 2 in the steel cord 1 of the present invention, any conventionally used filaments can be used; however, the filaments 2 are preferably made of a high-carbon steel containing not less than 0.80% by mass of a carbon component. By using a high-hardness and high-carbon steel containing not less than 0.80% by mass of a carbon component as the material of the filaments 2, an effect of reinforcing a rubber article, such as a tire or a belt, can be sufficiently obtained. Meanwhile, by controlling the content of the carbon component to be less than 1.5% by mass, ductility can be ensured, and the fatigue resistance can be improved.

Figure 2:
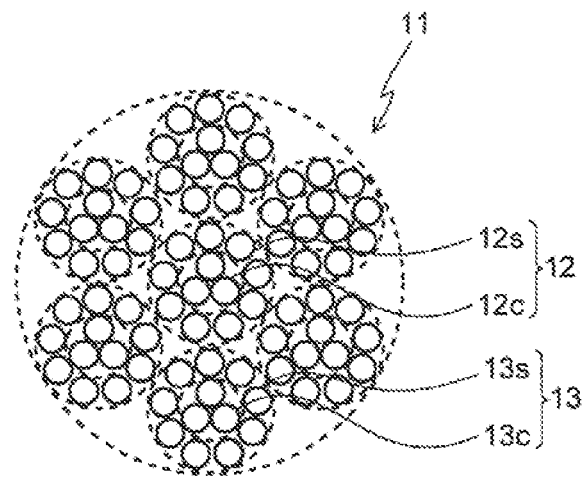
FIG. 2 is a cross-sectional view illustrating a steel cord for rubber article reinforcement according to another preferred embodiment of the present invention, which has a multi-twisted structure.

Next, a steel cord according to another preferred embodiment of the present invention will be described. FIG. 2 is a cross-sectional view illustrating a steel cord for rubber article reinforcement according to another preferred embodiment of the present invention, which has a multi-twisted structure. As illustrated, this steel cord according to another preferred embodiment of the present invention is a steel cord having a multi-twisted structure in which plural strands 1, each of which is the above-described steel cord according to one preferred embodiment of the present invention, are twisted together. In a steel cord 11 illustrated in FIG. 2, six sheath strands 13 are wound around a single core strand 12, and the core strand 12 and the sheath strands 13 have a structure in which nine sheath filaments 12$s$ and 13$s$ are twisted together around cores formed by twisting three core filaments 12$c$ and 13$c$, respectively.

In the illustrated example, six sheath strands 13 are twisted together on the outer circumference of a single core strand 12; however, the structure of the steel cord according to another preferred embodiment of the present invention is not restricted thereto. For example, plural core strands may be provided, or two core strands may be arranged in parallel to each other with or without being twisted together. The number of the sheath strands may be 6 to 10. Further, in the above-described another preferred embodiment of the present invention, the twist direction, the twist pitch and the like of the strands are also not particularly restricted and can be selected as appropriate in accordance with a conventional method.

The use of the steel cords 1 and 11 of the present invention is not particularly restricted, and the steel cords 1 and 11 of the present invention can be widely used in a variety of rubber products and components, for example, automobile tires and industrial belts such as dynamic transmission belts and conveyor belts, as well as rubber crawlers, hoses, and seismic isolation rubber bearings. Thereamong, the steel cords 1 and 11 of the present invention can be preferably used as tire reinforcing materials. Particularly the steel cords 1 and 11 of the present invention are suitable as belt reinforcing materials of tires for large construction vehicles, and useful for ultra-large construction vehicle tires having a rim diameter of 57 inches or larger, particularly 63 inches or larger.

Next, methods of producing the steel cords according to the present invention will be described. A method of producing the steel cord according to one preferred embodiment of the present invention (hereinafter, also simply referred to as "production method") includes: the brass plating step of plating a steel wire material with brass; the drawing step of drawing the resulting steel wire material; and the steel filament twisting step of twisting the thus obtained steel filaments 2 to form the steel cord 1. This production method according to one preferred embodiment of the present invention includes the zinc plating step of plating the core filaments 2$c$ with zinc before the steel filament twisting step. Further, the steel filament twisting step includes the zinc plating step of performing zinc plating after forming the core by twisting the core filaments 2$c$. A drawing process may be further added before the brass plating step.

A method of producing the steel cord according to another preferred embodiment of the present invention (hereinafter, also simply referred to as "production method") includes: the brass plating step of plating a steel wire material with brass; the drawing step of drawing the resulting steel wire material; the steel filament twisting step of twisting the thus obtained steel filaments to form the strands 12 and 13; and the strand twisting step of twisting the thus obtained strands 12 and 13. This production method according to another preferred embodiment of the present invention includes the zinc plating step of plating the core filaments 12$c$ and 13$c$ with zinc before the steel filament twisting step. Further, the steel filament twisting step includes the zinc plating step of performing zinc plating after forming the respective cores by twisting the core filaments 12$c$ or 13$c$. A drawing process may be further added before the brass plating step.

In the steel cords 1 and 11 of the present invention, zinc plating is further performed on the outer circumference of the brass plating of the core filaments 2$c$, 12$c$ and 13$c$. Accordingly, as a production method thereof, it is considered performing brass plating and zinc plating on a steel wire material, subsequently drawing the thus plated steel wire material to obtain filaments, and then twisting the filaments. However, as compared to drawing of a brass-plated filament, drawing of a zinc-plated steel wire material has problems in that it leads to a large amount of plating detachment and notable abrasion of a die. In order to solve these problems, it is necessary to reduce the drawing rate; however, this deteriorates the productivity.

Therefore, in the production methods of the present invention, filaments are prepared by drawing a brass-plated steel wire material, and zinc plating is subsequently performed on the core filaments 2$c$, 12$c$ and 13$c$. In addition, in the steel filament twisting step, zinc plating is performed after forming the core by twisting the core filaments 2$c$. By performing zinc plating after the drawing step in this manner, a reduction in the drawing rate of the steel wire material is inhibited, whereby problems such as detachment of plating and abrasion of a die can be avoided.

In the production methods of the present invention, the zinc plating step is preferably performed by electroplating.

In molten zinc plating that is common zinc plating, since a plating treatment is performed by immersing filaments in molten zinc at 450° C. or higher, the strength of the filaments is greatly reduced when the filaments have a strength of 2,500 MPa or higher. Therefore, in the production methods of the present invention, this problem can be avoided by performing the zinc plating step by electroplating.

Further, the production methods of the present invention preferably include the acid washing step of performing washing with an acid after the zinc plating on the brass plating of the core filaments 2c, 12c and 13c. By this acid washing, the zinc-plated surface is smoothened, and detachment of the plated zinc in the steel filament twisting step, which is caused by a super-steel guide of a twisting machine or the like, can be inhibited. The acid used for the acid washing may be, for example, nitric acid.

In the production methods of the present invention, means for performing brass plating on a steel wire material is not particularly restricted, and a brass-plated layer may be formed by sequentially plating copper and zinc and subsequently performing a thermal diffusion treatment, or by simultaneously plating copper and zinc.

In the production methods of the present invention, there is no particular restriction on other steps. For example, the steel wire material unwinding step, the steel wire material drawing step, the steel filament twisting step, the steel cord roll-up step and the like can be performed in the same order as in a conventional method. For example, a drawing method used in the drawing step performed after the brass plating step may be dry drawing or wet drawing; however, when a brass-plated steel wire is used for a steel cord, since the filament diameter thereof after final drawing is 0.8 mm or less, it is preferred to employ wet drawing.

EXAMPLES

The present invention will now be described in more detail by way of Examples thereof.

Example 1

As a steel wire material, one having a wire diameter of 1.86 mm, which was obtained by drawing and then patenting a piano wire rod having a diameter of 5.5 mm and a carbon content of 0.82% by mass, was used. This steel wire material was plated with copper and zinc and subsequently subjected to a thermal diffusion treatment to prepare a brass-plated steel wire material, which was drawn again to obtain filaments of 0.34 mm in diameter.

Thereafter, zinc plating was performed only on those steel filaments to be used as core filaments. The zinc plating was performed by electroplating and, after the zinc plating, the steel filaments were washed with nitric acid and then twisted together, whereby a steel cord of (3+9)×0.34 mm was produced.

Examples 2 and 3

As a steel wire material, one having a wire diameter of 1.86 mm, which is obtained by drawing and then patenting a piano wire rod having a diameter of 5.5 mm and a carbon content of 0.82% by mass, is used. This steel wire material is plated with copper and zinc and subsequently subjected to a thermal diffusion treatment to prepare a brass-plated steel wire material, which is drawn again to obtain filaments of 0.34 mm in diameter. Thereafter, zinc plating is performed only on those steel filaments to be used as core filaments. The zinc plating is performed by electroplating and, after the zinc plating, the steel filaments are washed with nitric acid and then twisted together, whereby a steel cord of (3+9)× 0.34 mm is produced.

Comparative Example 1

A steel cord is produced in the same manner as in Example 1, except that brass plating is not performed and zinc plating is performed before the drawing step.

Comparative Example 2

A steel cord is produced in the same manner as in Example 1, except that a steel cord of (3+9)×0.62 mm is produced by twisting steel filaments of 0.62 mm in diameter.

<Rubber Adhesion and Corrosion Resistance>

The steel cord of Example 1 was arranged in parallel to one another at intervals of 2.0 mm and subsequently coated with a rubber sheet from both above and below, and the resultant was vulcanized at 145° C. for 40 minutes to prepare a rubber-steel cord complex. The thus obtained rubber-steel cord complex was cut to expose the steel cords on one end, and the other end was sealed with a resin to prepare an evaluation sample. This evaluation sample was immersed in 10% saline for 6 days to be corroded and deteriorated, and the rubber adhesion state on the steel cords was evaluated. The rubber adhesion state was evaluated taking a case where the rubber adhered to the entirety of the steel cords as an index of 100. A larger index value indicates a superior state with a greater amount of adhered rubber. The corrosion resistance was evaluated in terms of the rust growth length, taking the rust growth length of Example 1 as an index of 100. The rubber adhesion state and the corrosion resistance are also evaluated in the same manner for the steel cords of Examples 2 and 3 and Comparative Examples 1 and 2.

<Productivity>

The productivity was expressed in terms of the weight of the cord produced per unit time, taking the value of Example 1 as an index of 100.

<Cord Weight>

The cord weight was expressed in terms of the weight of the respective steel cords at the time of being embedded such that the resulting rubber article-reinforcing materials had the same strength, taking the value of Example 1 as an index of 100. A smaller value indicates a lighter weight.

TABLE 1

|  |  |  | Comparative Example 1 | Example 1 | Comparative Example 2 | Example 2 | Example 3 |
|---|---|---|---|---|---|---|---|
|  | Timing of plating |  | A | B | B | B | B |
|  | Cord structure |  | 3 + 9 | 3 + 9 | 3 + 9 | 3 + 9 | 3 + 9 |
| Layer-twisted cord | Core filament | Diameter (mm) | 0.34 | 0.34 | 0.62 | 0.34 | 0.34 |
|  |  | Tensile strength (MPa) | 3,250 | 3,250 | 2,590 | 3,250 | 3,250 |

TABLE 1-continued

|  |  | Comparative Example 1 | Example 1 | Comparative Example 2 | Example 2 | Example 3 |
|---|---|---|---|---|---|---|
| Sheath filament | Diameter (mm) | 0.34 | 0.34 | 0.62 | 0.34 | 0.34 |
|  | Tensile strength (MPa) | 3,250 | 3,250 | 2,590 | 3,250 | 3,250 |
| Gap distance between sheath filaments, L (μm) |  | 27 | 27 | 49 | 27 | 27 |
| Amount of brass plating on core filaments (g/m$^2$) |  | — | 2.7 | 4.9 | 2.7 | 3.7 |
| Amount of zinc plating on core filaments (g/m$^2$) |  | 23.8 | 23.8 | 43.4 | 33.3 | 23.8 |
| Rubber adhesion (index) |  | 60 | 95 | 95 | 95 | 95 |
| Corrosion resistance (index) |  | 100 | 100 | 100 | 100 | 100 |
| Productivity (index) |  | 10 | 100 | 90 | 90 | 95 |
| Cord weight (index) |  | 100 | 100 | 125 | 100 | 100 |

Timing of plating A: Drawing was performed after zinc plating, followed by the steel cord production.
Timing of plating B: Drawing was performed after brass plating, and zinc plating was subsequently performed, followed by the steel cord production.

From Table 1, it is seen that the steel cords according to the present invention were produced with good productivity since zinc plating was performed after drawing the brass-plated steel wire material. It is also seen that the steel cords according to the present invention exhibited excellent rubber adhesion and corrosion resistance.

DESCRIPTION OF SYMBOLS 1, 11: steel cord
2: steel filament
2c: core filament
2s: sheath filament
12: core strand
12c: core filament
12s: sheath filament
13: sheath strand
13c: core filament
13s: sheath filament

The invention claimed is:

1. A steel cord for rubber article reinforcement formed by twisting plural steel filaments, the steel cord comprising: a core having at least one core filament; and a sheath having at least one sheath layer formed by twisting at least one sheath filament around the core,
wherein
brass plating is performed on the steel filaments, and zinc plating is further performed on the outer circumference of the brass plating of the at least one core filament,
the steel filaments have a diameter d of 0.1 mm to 0.6 mm, and
zinc plating is performed only on the outer circumference of the brass plating of the core filaments or on the outer circumference of the brass plating of the steel filaments other than the outermost-layer sheath filaments.

2. The steel cord for rubber article reinforcement according to claim 1, wherein the adhesion amount (g/m$^2$) of the brass plating on the at least one core filament is 6d to 10d, and the adhesion amount (g/m$^2$) of the zinc plating is 25d to 95d.

3. The steel cord for rubber article reinforcement according to claim 2, wherein the steel filaments have a tensile strength Ts (MPa) satisfying a relationship represented by the following formula:

$$(-2{,}000\times d+3{,}825)\leq Ts<(-2{,}000\times d+4{,}525).$$

4. The steel cord for rubber article reinforcement according to claim 2, wherein, in an outermost sheath layer constituting the sheath, a gap distance L between the at least one sheath filament is 50 μm or less.

5. The steel cord for rubber article reinforcement according to claim 1, wherein the steel filaments have a tensile strength Ts (MPa) satisfying a relationship represented by the following formula:

$$(-2{,}000\times d+3{,}825)\leq Ts<(-2{,}000\times d+4{,}525).$$

6. The steel cord for rubber article reinforcement according to claim 5, wherein, in an outermost sheath layer constituting the sheath, a gap distance L between the at least one sheath filament is 50 μm or less.

7. The steel cord for rubber article reinforcement according to claim 1, wherein, in an outermost sheath layer constituting the sheath, a gap distance L between the at least one sheath filament is 50 μm or less.

8. The steel cord for rubber article reinforcement according to claim 1, wherein the core has at least three core filaments.

9. A steel cord for rubber article reinforcement formed by twisting plural strands,
wherein
the strands each comprise: a core having at least one core filament; and a sheath having at least one sheath layer formed by twisting at least one sheath filament around the core,
brass plating is performed on the steel filaments, and zinc plating is further performed on the outer circumference of the brass plating of the at least one core filament, and
the steel filaments have a diameter d of 0.1 mm to 0.6 mm.

10. The steel cord for rubber article reinforcement according to claim 9, wherein the adhesion amount (g/m$^2$) of the brass plating on the at least one core filament is 6d to 10d, and the adhesion amount (g/m$^2$) of the zinc plating is 25d to 95d.

11. The steel cord for rubber article reinforcement according to claim 10, wherein the steel filaments have a tensile strength Ts (MPa) satisfying a relationship represented by the following formula:

$$(-2{,}000 \times d + 3{,}825) \leq Ts < (-2{,}000 \times d + 4{,}525).$$

12. The steel cord for rubber article reinforcement according to claim 10, wherein, in an outermost sheath layer constituting the sheath, a gap distance L between the at least one sheath filament is 50 μm or less.

13. The steel cord for rubber article reinforcement according to claim 9, wherein the steel filaments have a tensile strength Ts (MPa) satisfying a relationship represented by the following formula:

$$(-2{,}000 \times d + 3{,}825) \leq Ts < (-2{,}000 \times d + 4{,}525).$$

14. The steel cord for rubber article reinforcement according to claim 13, wherein, in an outermost sheath layer constituting the sheath, a gap distance L between the at least one sheath filament is 50 μm or less.

15. The steel cord for rubber article reinforcement according to claim 9, wherein, in an outermost sheath layer constituting the sheath, a gap distance L between the at least one sheath filament is 50 μm or less.

* * * * *